Oct. 13, 1931.  V. HUGHES  1,827,233

RUBBER SPRING BUSHING AND METHOD OF MAKING THE SAME

Filed Sept. 15, 1927

Inventor
Victor Hughes
By Blackmore, Spencer & Hrub
Attorneys

Patented Oct. 13, 1931

1,827,233

UNITED STATES PATENT OFFICE

VICTOR HUGHES, OF DETROIT, MICHIGAN, ASSIGNOR TO GENERAL MOTORS RESEARCH CORPORATION, OF DETROIT, MICHIGAN, A CORPORATION OF DELAWARE

RUBBER SPRING BUSHING AND METHOD OF MAKING THE SAME

Application filed September 15, 1927. Serial No. 219,721.

This invention relates to spring shackle joints having rubber as a component part thereof, and has particularly to do with spring shackle joints commonly used in automotive vehicles.

It is an object of the invention to produce a spring shackle joint which will give the desired resiliency when the car is subjected to shocks in any direction.

It is a further object of this invention to provide a method of mounting a cylindrical bearing member within the shell with a layer of rubber between the two so that the rubber will fill in any uneven or corrugated surfaces there may be in either and will be kept under considerable pressure.

It is a further object of the invention to provide an improved method of mounting the cylindrical bearing member within the shell and separated therefrom with rubber which will produce a finished product which when used with the conventional spring will take up all shocks and will firmly hold the inner member against movement in any direction relative to the outer shell.

Other objects and advantages of the invention will appear in the course of the following description, taken in connection with the accompanying drawings and appended claims.

Figure 1:
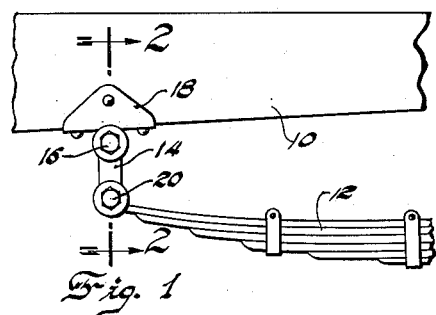
Fig. 1 is a view of a portion of an automotive vehicle necessary to illustrate the application of the invention.

Referring to the drawings, 10 indicates the longitudinal side members of the chassis of an automotive vehicle, 12 the usual leaf spring, and 14 the shackle arms supported by the pin 16 from a bracket 18 secured to the side member 10. At their lower ends the shackle arms are provided with a pin 20 which passes through the eye 22 of the spring 12. The pin 20 is serrated at least a portion of its length so that the pin can be nonrotatably fixed within the internally serrated inner hollow core 26 of the shackle. The bracket 18 has an eye 24, and within the eyes 22 and 24 is located the novel bracket joint or bearing of the present invention.

Figure 3:
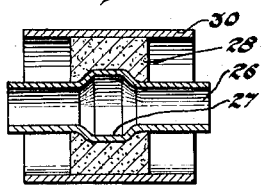
Fig. 3 is a sectional view of a spring shackle joint prior to the swaging operation.
Figure 4:
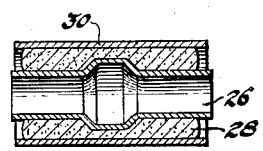
Fig. 4 is a view similar to Fig. 3 after the outer shell has been swaged.
Figure 8:
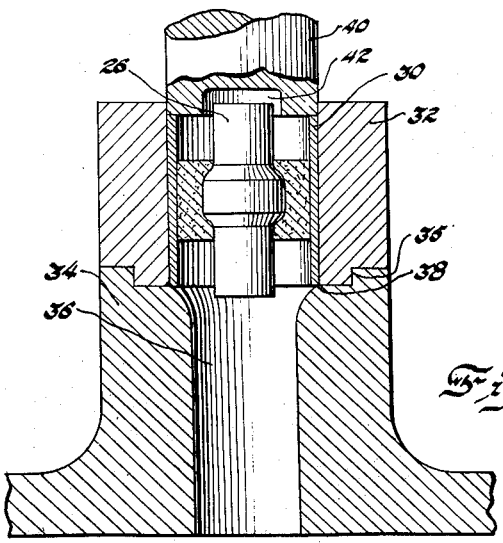
Fig. 8 is a sectional view of the dies for performing the swaging operation on the outer shell, the joint being shown as assembled in the first die.

The bearing consists of a hollow inner core 26 over which is placed a cylinder of rubber 28 which in turn is surrounded by the outer shell 30. The core 26 is preferably enlarged at its central portion, as shown at 27. The serrated pins 16 or 20 pass through the serrated bore of the core 26. The assembly as shown in Fig. 3 illustrates the parts in their relative position before the swaging operation has taken place. The means by which the outer shell is swaged is illustrated in Fig. 8 in which upper and lower dies 32 and 34 are employed. The dies preferably interfit, as shown at 35, and the upper die 32 is of a size to accommodate the outer shell, as shown in the assemblage in Fig. 3. The lower die 36 has an upwardly and outwardly diverging or horn shaped surface. It will be noted that the widest portion of this horn shaped aperture is of the same size as the inner surface of the die 32. A plunger 40 of substantially the same size as the bore of the die 32 is employed to force the assemblage into the lower die 34. The plunger 40 is preferably provided with a recess 42 at its center to accommodate the core 26, and acts in an axial direction to force the assemblage from the die 32 into the die 34, thereby causing the swaging operation to take place. After the assembly has been forced into the second die the construction will appear as shown in Fig. 4, in which form the rubber is placed under compression and has been caused to flow and substantially fill the space between the core 26 and shell 30. The result of the swaging operation is that the outer shell 30 is longer and slightly thinner than it was before the operation.

Figure 2:
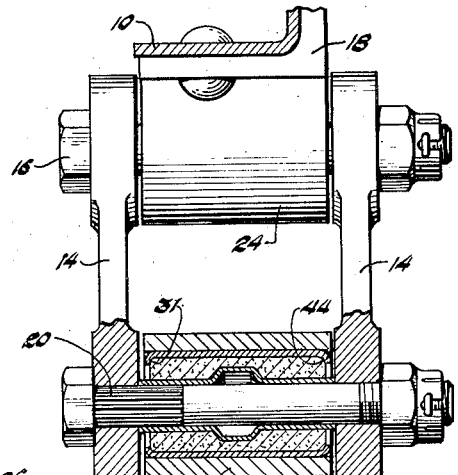
Fig. 2 is a section on the line 2—2 of Fig. 1.

In the finished bearing, as shown in Fig. 4, it will be noted that the shell 30 is of slightly less length than the core 26, the purpose of which is to allow for a space shown at 44 between the shell 30 and shackle arm 14. The ends of the shell 30 are preferably turned down, as shown at 31 in Fig. 2, although this construction is optional. The function of the down-turned edges is to further confine the rubber to prevent it working axially from the shell 30 and to allow for the space shown at 44.

Figure 5:
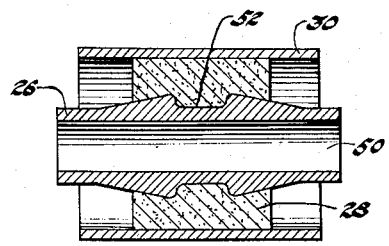
Fig. 5 is a view similar to Fig. 3 but using a modified form of core.
Figure 6:
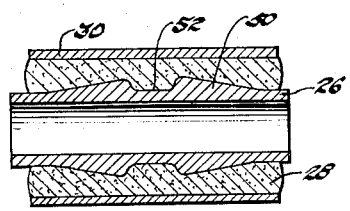
Fig. 6 is a view of the structure of Fig. 5 after the swaging operation has taken place.
Figure 7:
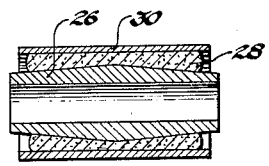
Fig. 7 is a sectional view of a still further modified form of spring shackle joint.

The structure of Figs. 5 and 6 is substantially the same as that of Figs. 3 and 4, with the exception that in the thickened central portion of the core 50 a groove 52 is provided. During the swaging operation the rubber will be caused to fill the groove 52 and give a more intimate contact between the compressed rubber and the middle core. A still further modified form is shown in Fig. 7 in which the central core is partly cone shaped. In this connection it may be remarked that the outer configuration of the inner core and the inner configuration of the outer shell may be varied within wide limits and may be curved and shaped as desired in order to provide the desired surfaces tending to hold the parts against relative lateral movement.

In the finished shackle, the external diameter of the outer shell 30 is slightly larger than the internal diameter of the eye 22 or 24 so that the shackle must be forced into position and will be held there. In this connection, it will be noted that the width of the eyes 22 and 24 is slightly less than the width of the inner member 26.

This construction provides a non-metallic connection between the eyes 22 and 24 of the spring and spring shackle and the arms 14, this connection being capable of absorbing shocks and giving way slightly in any direction.

I claim:

1. A joint comprising a bolt and arms, a shell surrounding said bolt and locked to said bolt, a second shell surrounding the first shell, the end of the inner shell abutting said arms, a resilient material under compression arranged between said shells but out of contact with said arms, said second shell swedged onto the first to compress the rubber and an eye member surrounding said second shell.

2. In a spring shackle, an inner core having an enlarged mid-portion, an elastic member under compression on said core, means on said core to retain said elastic member against lateral movement, and a swedged outer shell over said elastic medium.

3. A method of making a bearing consisting of assembling the central core and an elastic cylinder inside an outer shell, placing the assembly in a die and then forcing the assembly into a smaller die, thereby swaging the outer shell and causing the elastic material to flow.

4. The method according to claim 3, said dies being placed end to end.

5. The method according to claim 3, said dies being placed end to end and the said assembly being forced axially into said second die.

6. The method of making a bearing consisting of assembling a cylinder of elastic material over a central core and within an outer shell, forcing the assembly into a die then fitting the die on to a second smaller die, then forcing the assembly by means of a plunger acting on the shell into a second die.

7. The method according to claim 6, said dies being axially arranged and said plunger forcing said assembly in an axial direction.

8. In a spring shackle, an inner core having an enlarged mid-portion, an elastic member under compression on said core, a groove on said mid-portion to retain said elastic member against lateral movement, and a swedged outer shell over said elastic medium.

9. In a joint, an inner core, an enlargement at substantially the mid-portion of said core, a single cylinder of elastic material over said core and enlargement, and an outer shell over said material.

10. In a joint, a core, a plurality of tapered formations on said core, a deformable elastic medium over said core and tapered formations, and an outer shell over said medium and holding said medium under compression.

11. In a joint, a core, a plurality of spaced tapered formations on said core, said formations having their larger portions facing each other, a shell over said core, and a deformable elastic medium under compression between said core and shell.

In testimony whereof I affix my signature.

VICTOR HUGHES.